US006961642B2

(12) United States Patent
Horst

(10) Patent No.: US 6,961,642 B2
(45) Date of Patent: Nov. 1, 2005

(54) SYSTEM AND METHOD FOR REDUCING AN INSTANTANEOUS LOAD IN AN APPLIANCE

(75) Inventor: Gale R. Horst, Watervliet, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 255 days.

(21) Appl. No.: 10/295,148

(22) Filed: Nov. 15, 2002

(65) Prior Publication Data

US 2004/0098171 A1 May 20, 2004

(51) Int. Cl.[7] .............................................. G05F 1/66
(52) U.S. Cl. ................................................... 700/295
(58) Field of Search .............................. 700/275, 276, 700/286, 291, 295, 297; 705/7, 10; 307/31–35, 307/38–41; 702/57–62

(56) References Cited

U.S. PATENT DOCUMENTS

| 4,090,088 | A | * | 5/1978 | McMahon et al. ............. 307/38 |
| 4,819,180 | A | * | 4/1989 | Hedman et al. ............. 700/291 |
| 4,847,781 | A | * | 7/1989 | Brown et al. ............... 700/296 |
| 4,847,782 | A | * | 7/1989 | Brown et al. ............... 700/296 |
| 5,017,799 | A | * | 5/1991 | Fishman ...................... 307/34 |
| 5,168,170 | A | * | 12/1992 | Hartig ......................... 307/35 |
| 5,502,339 | A | * | 3/1996 | Hartig ......................... 307/31 |
| 5,543,667 | A | * | 8/1996 | Shavit et al. ................. 307/39 |
| 5,581,132 | A | * | 12/1996 | Chadwick ..................... 307/38 |
| 6,111,762 | A | * | 8/2000 | Igarashi et al. ........... 363/21.16 |
| 6,177,739 | B1 | * | 1/2001 | Matsudaira et al. ........ 307/125 |
| 6,369,643 | B1 | * | 4/2002 | Lee et al. .................... 327/544 |
| 6,487,509 | B1 | * | 11/2002 | Aisa ............................ 702/62 |
| 6,493,643 | B1 | * | 12/2002 | Aisa ............................ 702/60 |
| 6,519,509 | B1 | * | 2/2003 | Nierlich et al. ............. 700/286 |
| 6,621,179 | B1 | * | 9/2003 | Howard ....................... 307/38 |
| 6,631,622 | B1 | * | 10/2003 | Ghent et al. ................. 62/231 |
| 6,681,154 | B2 | * | 1/2004 | Nierlich et al. ............. 700/286 |
| 6,745,106 | B2 | * | 6/2004 | Howard et al. ............. 700/276 |
| 2002/0019758 | A1 | * | 2/2002 | Scarpelli ....................... 705/7 |
| 2002/0019802 | A1 | * | 2/2002 | Malme et al. ................ 705/37 |

* cited by examiner

Primary Examiner—Maria N. Von Buhr
(74) Attorney, Agent, or Firm—Stephen Krefman; Robert O. Rice; John F. Colligan

(57) ABSTRACT

An appliance having at least one component, a receiver, and a controller. The component is configured to operate in a normal operation mode and a resource savings mode; wherein an instantaneous resource demand of the at least one component is greater during the normal operation mode than during the resource savings mode. The receiver is adapted to receive a curtailment signal. The controller is connected to the receiver and the component, and determines if a curtailment signal has been received by the receiver. If the curtailment signal was received, the controller determines whether the component should be operated in the resource savings mode, and if so, the controller operates the component in the resource savings mode, and if not, the controller operates the component operated in the normal operation mode.

28 Claims, 4 Drawing Sheets

SYSTEM AND METHOD FOR REDUCING AN INSTANTANEOUS LOAD IN AN APPLIANCE

BACKGROUND

Many utility providers experience a shortage of resources due to increasing consumer demand, and more specifically, increasing demands for the resources. For example, generating plants are often unable to meet power demands resulting from an electricity load demanded by many consumers at the same time.

Presently, in an attempt to reduce high demands, many utility providers have instituted time of use rates which include higher rates for resource usage during on-times and lower rates for resource usage during off-times. However, these time of use rates are only incentives and therefore rely on the consumer to curtail his own energy usage.

Therefore, there is a need to provide a system to automatically reduce the instantaneous load demand for a resource.

SUMMARY OF THE INVENTION

The present invention provides an appliance having a component, a receiver or detector, and a controller. The component is configured to operate in a normal operation mode and a resource savings mode; wherein an instantaneous resource demand of the at least one component is greater during the normal operation mode than during the resource savings mode. The receiver is configured to accept or detect a curtailment signal or need. The controller is connected to the receiver and the component, and is configured to determine if a curtailment signal is received by the receiver. The controller is configured to determine, upon receipt of the curtailment signal, whether the component should be operated in the resource savings mode. The component is operated in the normal operation mode if the curtailment signal is not received or if the determination is negative, and the component is operated in the resource savings mode if the curtailment signal is received and the determination is positive.

Operating the component in the resource savings mode may include any of the following actions: deactivating at least one component; operating at least one component at a lower setting than in the normal operation mode; increasing a duration of an operation cycle being performed by the appliance; reducing a duration of an operation cycle being performed by the appliance; skipping a step in an operation cycle being performed by the appliance; and reducing a lighting intensity of a consumer interface display or some other lighting element.

In another embodiment, the controller may also be configured to prevent operation of the at least one component in the resource savings mode if operation of the at least one component in the resource savings mode may damage a user content in the appliance or some portion or component of the appliance or cause some other unacceptable consequence. The appliance may also include an override device to allow a user to prevent the controller from operating the at least one component in the resource savings mode.

In yet another embodiment, the appliance may further include a curtailment need detection device located in the appliance or connected to the appliance, wherein the curtailment need detection device transmits a curtailment signal to the receiver if the instantaneous resource demand of the appliance exceeds a predetermined level.

In another aspect, the present invention provides an appliance comprising a control to select an operation cycle to be performed by the appliance; at least one component for performing the operation cycle; a receiver to receive a curtailment signal; and means for reducing an instantaneous resource demand of the at least one component in response to the curtailment signal being received by the receiver.

In yet another aspect, the present invention provides a method for reducing instantaneous resource demand of an appliance comprising determining an operation cycle to be performed by the appliance; providing an appliance having at least one component to perform the operation cycle, the at least one component configured to operate in a normal operation mode and a resource savings mode, wherein an instantaneous resource demand of the at least one component is greater during the normal operation mode than during the resource savings mode; determining if a curtailment signal is received, and if so, whether the component should be operated in the resource savings mode; operating the at least one component in the normal operation mode if either determination is negative; and operating the at least one component in the resource savings mode if both determinations are positive.

DETAILED DESCRIPTION

The present invention is an load reduction system and process for reducing instantaneous demand for resources of a utility provider. More specifically, in one aspect, the present invention allows the utility provider to communicate with appliances in a household or other establishment in order to initiate a reduction in instantaneous demand for the utility provider's resources. The load reduction system may be employed in conjunction with any type of appliance that consumes a resource such as electricity, water, or gas. For example, the appliance may be a washer, a dryer, an oven, a dishwasher, a refrigerator, a freezer, a hot water heater, a thermostat, a motor, a pump, a heating, ventilation, or cooling infrastructure, or other similar devices. As used herein, the term "appliance" also is intended to cover groups of individual appliances, such as numerous appliances in a single household or establishment, or in groups of households or establishments in neighborhoods, communities or other groupings as well as internal components of an individual appliance. The term "component" is intended to cover internal components of an individual appliance, and well as an individual appliance in a group of several appliances, a single household in a group of households, etc. Thus, a "component" is a part of an "appliance".

Although the invention may be embodied in many different types of appliances, for purposes of illustration and explanation, an embodiment of the invention in a clothes dryer is described in detail below. It will be appreciated and understood by a person of skill in the art that the principles of the invention disclosed with respect to the dryer could be implemented in other appliance in which other components such as compressors, other motor driven components, lighting components, heating components, cooling components, water consuming components or gas consuming components are employed.

Figure 1:
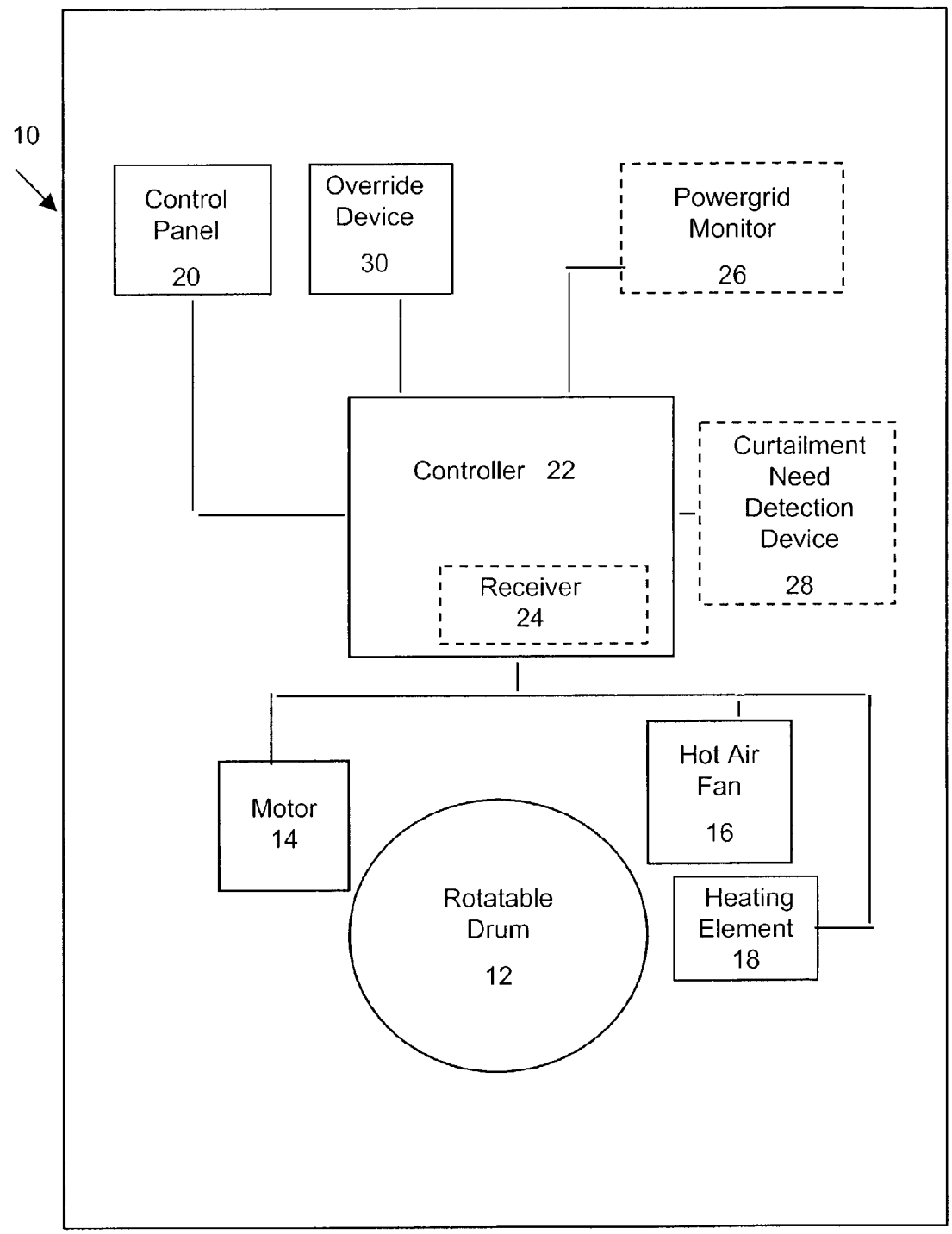
FIG. 1 is a block diagram of one embodiment of the present invention in association with a dryer.

FIG. 1 shows one embodiment of the load reduction system in association with a dryer. The dryer 10 may have various components including a rotatable drum 12, a motor 14 to rotate the drum, a hot air fan 16, an electric or gas heating element 18, and a control panel 20. The control panel 20 may be an LCD interface display, control knobs, switches or any other interface for selecting an operation cycle of the dryer.

The motor 14 is preferably configured to operate in at least two settings, a normal motor speed and a lower motor speed. When operated in the lower motor speed, the motor consumes fewer kW per hour than when operated in the normal motor speed but also rotates the rotatable drum 12 at a lower number of rotations per minute (RPM). Similarly, the hot air fan 16 may also be configured to operate in at least two settings, a normal fan speed and a lower fan speed that consumes fewer kW per hour but circulates less hot air than the normal fan speed.

The load reduction system in the dryer may include a controller 22. In one embodiment shown in FIG. 1, the controller may include a receiver 24 configured to receive a curtailment signal transmitted which may be transmitted from an external source. The receiver may be as simple as an electrical contact, a wire or a wireless connection to a curtailment signal source, or may be a more complex element, such as circuitry and memory elements to receive and store the curtailment information. The curtailment signal includes a signal to inform the appliance to engage the load reduction system. The curtailment signal may be generated by a utility provider, such as a power company, and can be transmitted via a power line, as a radio frequency signal, or by any other means for transmitting a signal when the utility provider desires to reduce demand for its resources.

Alternatively, the curtailment signal may also be generated by any device or system that monitors instantaneous resource usage of an appliance, a household, or a neighborhood, etc. For example, the load reduction system may include a powergrid monitor 26 located in or connected to the appliance to monitor the load on the powergrid or stability of the powergrid and to determine if load reduction is necessary.

The curtailment signal may also be generated by a curtailment need detection device 28 located in or connected to the appliance and connected to the controller. The curtailment need detection device may be configured to detect whether energy usage by the appliance is exceeding a predetermined resource usage level and to produce a curtailment signal if the appliance exceeds this predetermined level. The predetermined level may be programmed into the curtailment need detection device by the manufacturer of the appliance, or may alternatively be input by the appliance user.

A manual operation by a user of the appliance or other authorized person may also be used to generate the curtailment signal.

Although several possible means for generating a curtailment signal are discussed above, it should be understood that the present invention may be used with any device or system, whether automatic or manual, that is configured to determine whether load reduction is necessary.

In one embodiment, the controller 22 is connected to the control panel 20 in order to receive signals regarding the operation cycle selected by the user. The controller is also connected to the components of the dryer, i.e. the motor 14, the hot air fan 16, the heating element 18, and the control panel 20. When an operation cycle (such as a regular, permanent press, or delicate drying cycle) is selected by the user, the components of the dryer are actuated by the controller to perform the selected operation cycle.

If a curtailment signal has not been received, the components of the dryer are operated in a normal operation mode. In the normal operation mode, the motor is operated at the normal motor speed setting, the fan is operated at the normal fan speed setting, and the heating element is turned on.

If a curtailment signal has been received at any time during performance of the operation cycle, the controller makes a determination of whether one or more of the components should be operated in a resource savings mode and if so, it signals the appropriate components of the dryer to begin operating in the resource savings mode in order to reduce the instantaneous amount of energy being consumed by the dryer. The controller determines what components should be operated at a lower consumption level and what that lower consumption level should be, rather than an uncontrolled immediate termination of the operation of the appliance or specific components upon receipt of the curtailment signal.

In the resource savings mode, the motor may be operated in the lower motor speed setting, and the air fan may be operated at the lower fan speed setting. The heating element may also be turned off, cycled on and off with longer off periods than normal, or energized at a lower level during the resource savings mode. If the control panel is an LCD interface display or other type of lit interface display, the lighting of the interface display may also be reduced or turned off when the dryer is operated in the resource savings mode. In order to compensate for the lower settings of the motor, fan, and heating element, the controller may also extend the duration of the operation cycle being performed such that clothes in the dryer are sufficiently dried.

The present invention also contemplates the performance of other types of actions to reduce demand for resources depending on the appliance being used with the load reduction system. For example, in addition to deactivation and curtailment of components in the appliance as discussed above, the load reduction system may also shorten the duration of an operation cycle being performed by the appliance, skip a step in the operation cycle being performed, reduce or eliminate lighting within a region or cavity of the appliance, or any other type of action that may reduce instantaneous consumption of energy or other resource.

The determination of which components are operated in a resource savings mode, and whether any other resource saving actions are initiated, may depend on the particular cycle and where in the cycle the appliance is currently operating. In some cases, a complete shutdown of the appliance may be appropriate, but it is the controller that will make this determination, not just the presence of the curtailment signal.

In one embodiment, the controller may include functionality to determine whether activation of the resource savings mode for any component would potentially cause damage to any user content in the appliance or to any component of the appliance itself or would cause the appliance to fail to perform its intended function, such as a complete drying of the clothes in a dryer, complete cooking of food in a cooking appliance or complete cleaning of clothes in a washing machine. Any one of such results is referred to herein as an unacceptable consequence. If the controller determines that an unacceptable consequence may occur by performing an energy saving action, such as deactivating or curtailing the operation of a component in the appliance, the controller may opt-out of performing that specific energy saving action or may institute or extend other procedures.

For example, if the present invention is used in a refrigerator, controller may determine that deactivation or limitation of the operation of the compressor may prevent the refrigerator from achieving a temperature that can adequately refrigerate food. Accordingly, the controller will not deactivate or limit the operation of the compressor when the curtailment signal is received. Similarly, in an appliance having a heating element and a fan, the controller may determine that the deactivation or limitation of the operation of the fan may result in overheating of the heating element which has not yet been deactivated or limited. As a result, the controller aids in preventing user content or the appliance itself from being damaged by the load reduction system.

The controller may also determine whether deactivation or curtailment of a component would prevent the appliance from performing its desired function. For example, if the controller determines that deactivation or curtailment of a component would result in under-cooked food in an oven, under-cleaned clothes in a washer, or under-dried clothes in a dryer, the controller may opt-out of performing that specific energy savings action or may increase the time that a function is performed, such as a length of cooking, washing or drying, or perform some other steps to complete the desired or selected operation.

The duration of time that the dryer operates in resource savings mode may be determined by information in the curtailment signal. In one embodiment, the curtailment signal includes information containing a time period for which the load reduction system should remain engaged. For example, the curtailment signal may inform the appliance to engage the load reduction system for a few minutes or for one hour, at which time the dryer returns to normal operation. Alternatively, the curtailment signal may be continuously transmitted by the utility provider, or other curtailment signal generating system, as long as it is determined that instantaneous load reduction is necessary. Once transmission of the curtailment signal has ceased, the dryer returns to normal operation mode. In yet another embodiment, a curtailment signal may be transmitted to the appliance to signal the appliance to activate the load reduction system. A normal operation signal may then be later transmitted to the dryer to signal the dryer to deactivate the load reduction system and to return operation of the dryer to normal operation mode.

The load reduction system may also include an override device 30 that allows the user to deactivate the load reduction system. The override device 30 may be a single button such that the load reduction system is deactivated when the button is depressed and the load reduction system is activated when the button is not depressed, or vice versa. Alternatively, the override device 24 may also be a switch, a touch panel, or any other type of device associated with the appliance that allows for the user to activate or deactivate the load reduction system. Such devices could also include arrangements connected to the appliance in some fashion rather than being a physical part of the appliance. These arrangements could include a connected computer including a home computer or a connection to a computer network, whether a local area network or a larger network such as the internet where the user could use an input device to send a signal to the appliance. Further, the override device may allow the user to intercept a curtailment signal before it reaches the appliance or the receiver, or even to prevent the curtailment signal from being sent to the appliance or receiver from the original source of the signal.

Figure 2:
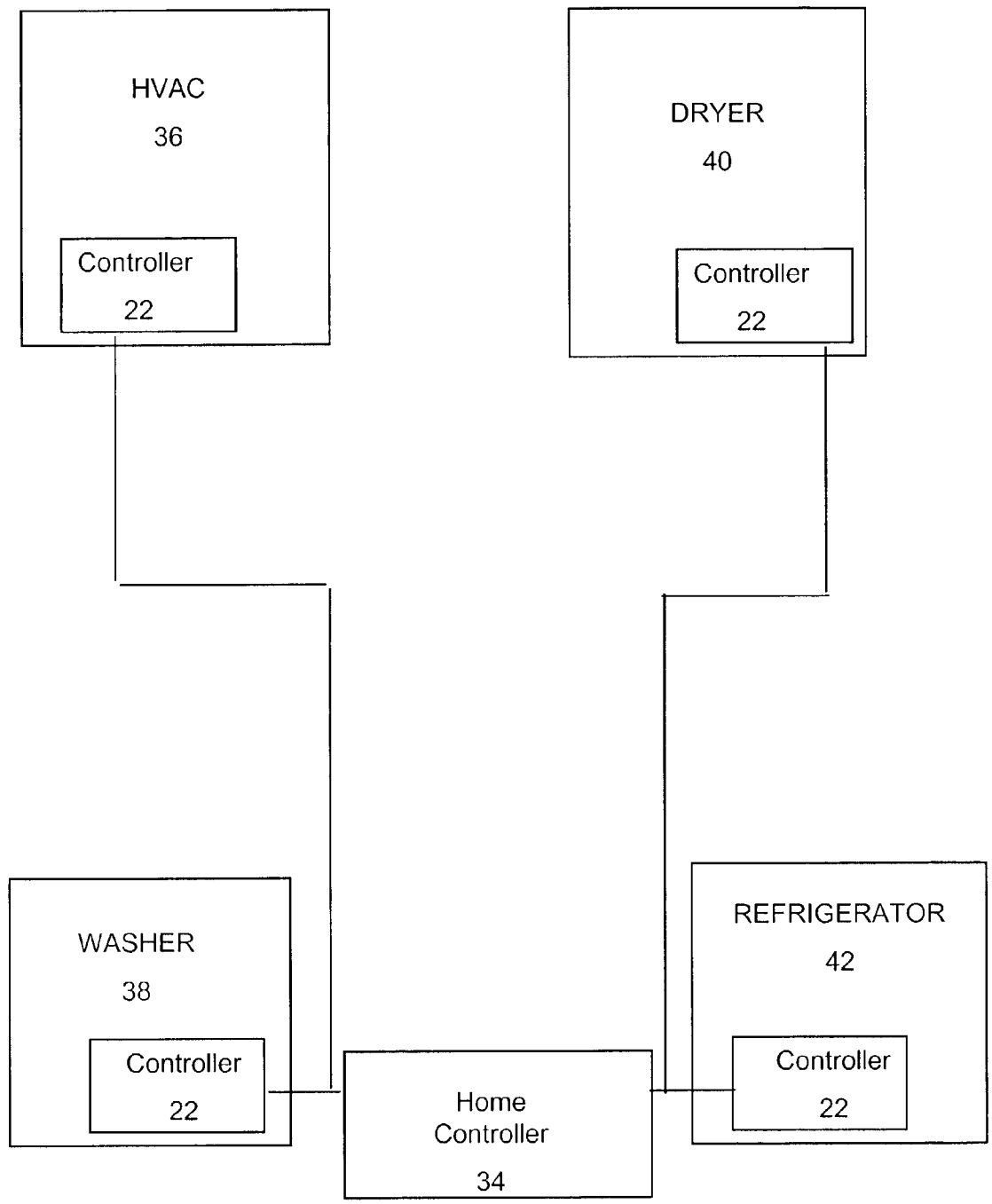
FIG. 2 is a block diagram of another embodiment of the present invention.

As shown in FIG. 2, the load reduction system may also be used to reduce instantaneous load of a household or other establishment. In this embodiment, the load reduction system may include a home control device 34 preferably connected to the controller 22 in various appliances in the household, such as an HVAC 36, a dryer 38, a washer 40, and a refrigerator 42, or any other appliance that consumes resources. The home control device may also include any type means for receiving a curtailment signal as described above. Thus, the home control device may be configured to receive a curtailment signal from a utility provider, firm a powergrid monitor, from a curtailment need detection device located connected to the various appliances or any other type of device or system capable of determining whether instantaneous load reduction is necessary or a manually operated signal generator.

When a curtailment signal is received by the home controller 34, the controller 34 may make a determination to signal one or more of the various appliances 36, 38, 40, and 42 to reduce its instantaneous resource demand by transmitting a signal to the various appliances. Each appliance, through its controller, may then individually determine which components to disengage or curtail as described above. Various components, if they have separate controllers, may then determine their own resource reduction mode of operation. If the curtailment signal received by the home controller includes information regarding the amount of resource reduction that is needed, the home controller 30 may include software or firmware to determine the appliance or group of appliance that need to be deactivated or curtailed to achieve the resource reduction specified by the curtailment signal.

Additionally, the home controller 34 may also be configured to determine whether curtailing or disengaging any appliances connected to the home controller would cause damage to the appliance or the household or prevent desired operation of the appliance or other unacceptable consequence. If the home controller determines that curtailing or disengaging an appliance may cause an unacceptable consequence, the home controller will not signal that appliance to reduce its instantaneous resource demand, or to reduce its instantaneous resource demand in a way so as to avoid the unacceptable consequence.

Furthermore, the home controller may also be programmed by the utility provider or the user to maintain specific household settings regardless of whether or not a curtailment signal is received by the home controller 30. For example, a user may program the home controller to maintain a household temperature below 70 degrees Fahrenheit. Accordingly, the home controller may not signal the HVAC to operate in resource savings mode if doing so would increase the household temperature above 70 degrees.

Figure 3:
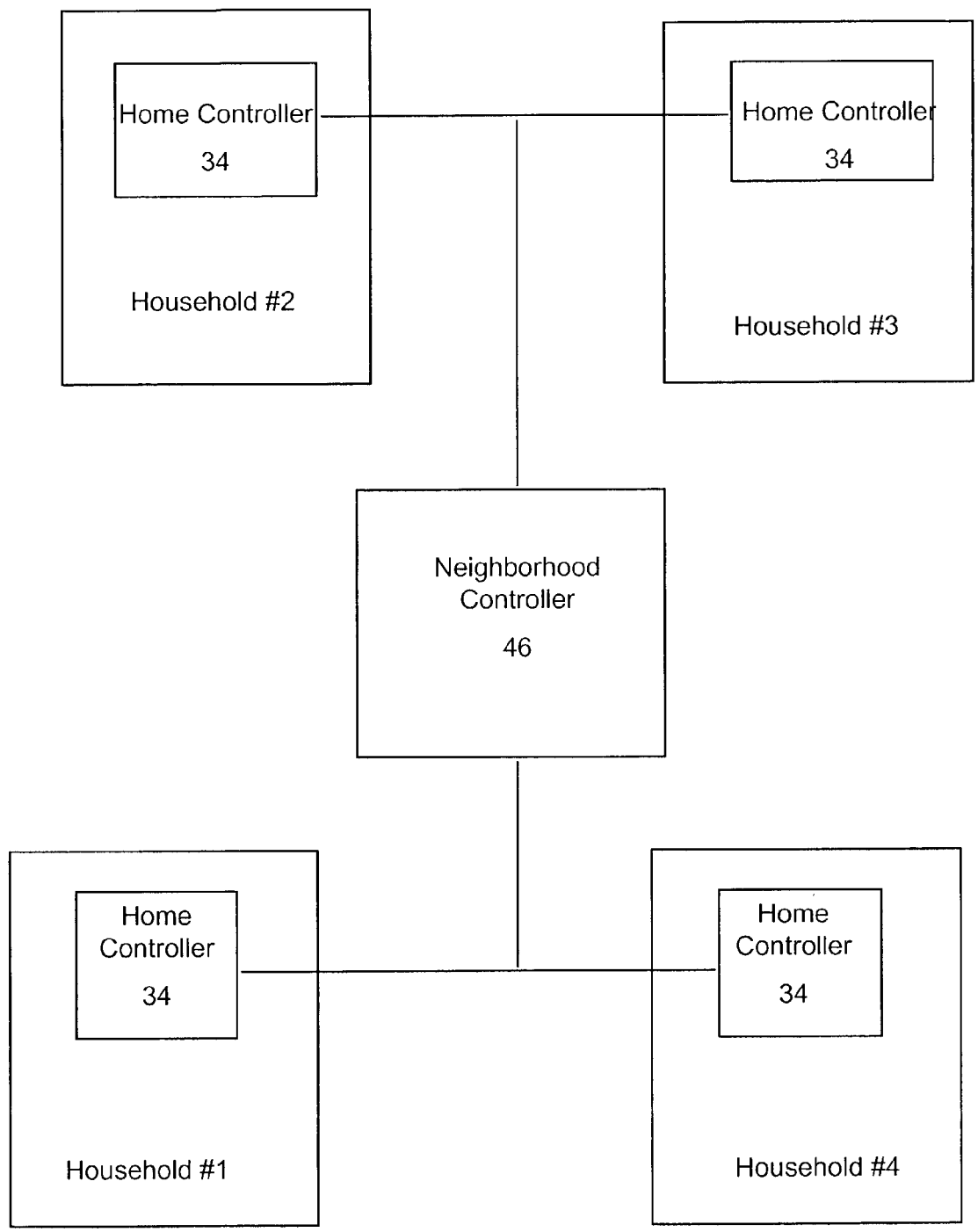
FIG. 3 is a block diagram of yet another embodiment of the present invention.

In yet another embodiment shown in FIG. 3, the present invention may include a neighborhood controller 46 connected to various households or establishments in a neighborhood, community or other grouping of households or establishments. As in the embodiment described above, the neighborhood controller 46 may also include any type means for receiving a curtailment signal as described above. If a curtailment signal is then received by the neighborhood controller 46, the neighborhood controller determines which households should be signaled to reduce their instantaneous resource load and transmits a signal to those households. Each household or establishment controller then recursively determines which appliance should reduce its instantaneous resource load as described above with respect to FIG. 2. Each appliance controller receiving a curtailment signal then recursively determines which components should be operated in a reduced demand mode, and each component having a controller may recursively determine how it best can reduce its demand.

Figure 4:
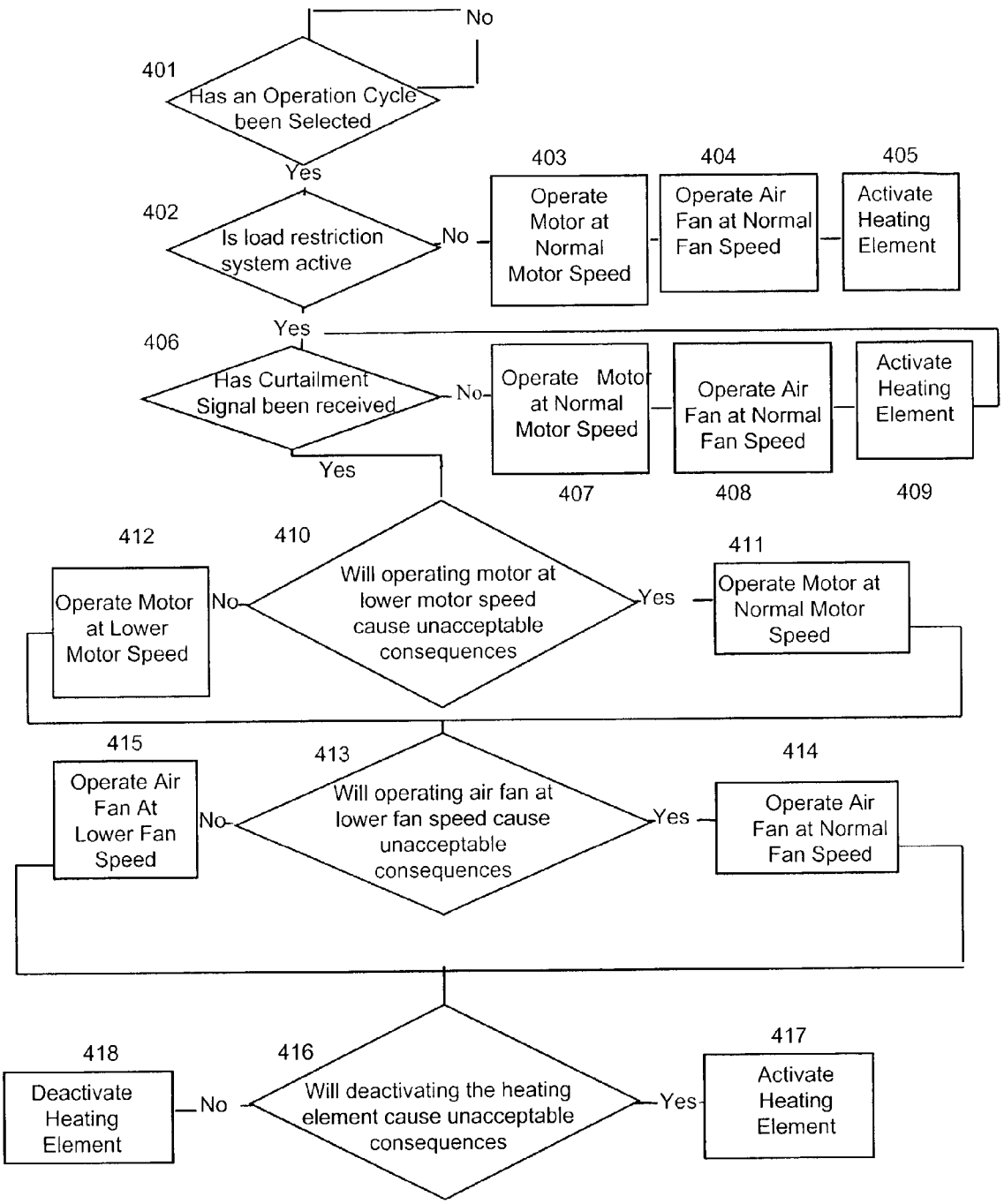
FIG. 4 is a flowchart of a process for performing the present invention.

FIG. 4 illustrates the process for performing the load reduction system in association with the dryer of FIG. 1. In step 401, the process determines if an operation cycle has been selected by the user. If an operation cycle has not been selected, the appliance components are turned off and the process remains at step 401. If an operation cycle has been selected, the process then proceeds to optional step 402. In optional step 402, the process determines if the load reduction system is active. If the load reduction system is deactivated via the override device, the process actuates the motor 14 at normal motor speed (Step 403), the hot air fan 16 at normal fan (Step 404), and activates the heating element 18 (Step 405). If, in step 402, the load reduction system is active, the process proceeds to step 406.

Step 406 determines if a curtailment signal has been received by the receiver. If no curtailment signal has been received, the motor 14 is operated at normal motor speed (Step 407), the hot air fan 16 is operated at normal fan speed (Step 408), and the heating element 18 is activated (Step 409). The process then returns to step 406 in which the process again determines whether a curtailment signal has been received. If, in step 406, a curtailment signal has been received, the process proceeds to step 410. In step 410, the process determines whether operating the motor 14 at the lower speed setting could potentially damage any user contents or components in the dryer. If step 410 determines that damage may occur, the motor is operated at normal motor speed (Step 411). If step 410 determines that no damage would occur by operating the motor at the lower speed setting, the process proceeds to step 412 and the motor is operated at the lower speed setting.

Similarly, step 413 determines if operating the air fan 16 at the lower fan speed could potentially damage user contents or any components in the dryer. If the operation of the air fan at the lower fan speed may cause damage, the air fan is operated at normal fan speed (414). If operation of the air fan at the lower speed setting will not cause damage, the air fan is operated at the lower speed setting (Step 415).

Step 416 then determines if deactivating the heating element may damage the user contents or any dryer components. Again, if deactivating the heating element may cause damage, the heating element is activated (Step 417). If deactivating the heating element would not cause damage, the heating element is deactivated (Step 418).

Thus, the present invention contemplates a method and apparatus for reducing the instantaneous resource demand of an appliance, whether that appliance is an internal component of an individual appliance, an individual appliance, a group of individual appliances in a household or establishment, or a plurality of individual appliances located in different households or establishments in a neighborhood, community or other grouping. A curtailment command, which may be generated internally or externally and automatically or manually, is used to initiate a reduction in the instantaneous resource demand by a determination of which components can be safely and without unacceptable consequences, operated in a resource savings mode, and then those components are operated in that resource savings mode so long as the curtailment command is in effect. The curtailment command can be given at the community level, the individual household or establishment level, the individual appliance level or at an internal component level.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

The embodiments of the invention in which an exclusive property or privilege is claimed are defined as follows:

1. An appliance comprising:
    at least one component configured to operate in a normal operation mode and a resource savings mode, wherein a resource demand of the at least one component is greater during the normal operation mode than during the resource savings mode;
    a controller configured to implement an operation cycle of the appliance and operably coupled to the at least one component to control the operation of the at least one component as needed to implement the operation cycle, the controller further configured to receive a curtailment signal representative of an external request to reduce the resources consumed by the appliance and determine if the at least one component should be operated in the resource savings mode in response to the receipt of a curtailment signal;
    wherein when implementing the operation cycle, the controller operates the at least one component in the normal operation mode if the curtailment signal is not received or if the controller determines the at least one component should not be operated in the resource savings mode, and the controller operates the at least one component in the resource savings mode if the curtailment signal is received and the controller determines that the at least one component should be operated in the resource savings mode.

2. The appliance of claim 1 wherein the controller determines whether to operate the component in the resource savings mode based on whether such operation would result in unacceptable consequences regarding the implementation of the operation cycle.

3. The appliance of claim 1 wherein the unacceptable consequences comprise causing damage to any user content in the appliance or to the at least one component.

4. The appliance of claim 1 and further comprising multiple components configured to operate in a normal operation mode and a resource savings mode and the controller is operably coupled to the multiple components and determines which of the multiple components will be operated in the resource savings mode upon the receipt of a curtailment signal.

5. The appliance of claim 1 wherein the controller determines which of the multiple components in the resource savings mode based on whether such operation would result in unacceptable consequences regarding the implementation of the operation cycle.

6. The appliance of claim 5 wherein the unacceptable consequences comprise causing damage to any user content in the appliance or to any of the multiple components.

7. The appliance of claim 1 wherein the controller further comprises a receiver configured to receive the curtailment signal.

8. The appliance of claim 1 further comprising a manual override device to enable a user to prevent the controller from operating the at least one component in the resource savings mode.

9. The appliance of claim 1 wherein the resource savings mode includes deactivating the at least one component.

10. The appliance of claim 1 wherein the resource savings mode includes operating the at least one component at a lower resource consumption level than in the normal operation mode.

11. The appliance of claim 10 wherein the resource savings mode includes increasing a duration of operation of the at least one component during at least a portion of the operation cycle.

12. The appliance of claim 1 wherein the resource savings mode includes reducing a duration of the operation of the at least one component during the operation cycle.

13. The appliance of claim 1 wherein the operation cycle comprises multiple steps, with at least one of the steps requiring the operation of the at least one component, and the resource savings mode includes skipping the step requiring the operation of the at least one component.

14. The appliance of claim 1 wherein the resource savings mode includes reducing a lighting intensity.

15. The appliance of claim 1 wherein the curtailment signal is directly received from a source external of the appliance.

16. The appliance of claim 15 wherein the curtailment signal is received via a powerline supplying power to the controller.

17. The appliance of claim 15 wherein the curtailment signal is received via a radio frequency signal.

18. The appliance of claim 1 further including a curtailment need detection device, wherein the curtailment need detection device transmits a curtailment signal to the controller if an instantaneous resource load exceeds a predetermined level.

19. The appliance of claim 1 wherein the appliance is a clothes dryer having components including at least a motor, fan, heating element, and control panel.

20. A method for reducing resource demand of an appliance comprising:

providing an appliance comprising at least one component to perform at least a portion of an operation cycle and configured to operate in a normal operation mode and a resource savings mode, wherein a resource demand of the at least one component is greater during the normal operation mode than during the resource savings mode, and a controller operably coupled to the at least one component and configured to control the operation of the least one component to implement the operation cycle;

the controller receiving a curtailment signal;

the controller determining whether the at least one component can be operated in the resource savings mode without causing damage to any user content in the appliance or to the at least one component; and the controller operating the at least one component in the resource savings mode if the determination is positive.

21. The method of claim 20 wherein the step of operating the at least one component in the resource savings mode includes deactivating the at least one component.

22. The method of claim 21 wherein the step of operating the at least one component in the resource savings mode includes operating the at least one component in the appliance at a lower resource consuming setting than in the normal operation mode.

23. The method of claim 22 wherein the step of operating the at least one component in the resource savings mode includes increasing a duration of the operation cycle being performed by the appliance.

24. The method of claim 20 wherein the step of operating the at least one component in the resource savings mode includes reducing a duration of the operation cycle being performed by the appliance.

25. The method of claim 20 wherein the step of operating the at least one component in the resource savings mode includes skipping a step in an operation cycle being performed by the appliance.

26. The method of claim 20 wherein the curtailment signal is transmitted from an external source.

27. The method of claim 20 wherein the curtailment signal is transmitted from an internal source.

28. The method of claim 20 including the step of preventing an operation of the at least one component in the resource savings mode if a reduction of the instantaneous resource demand may cause an unacceptable consequence.

* * * * *